United States Patent [19]

Meili et al.

[11] Patent Number: 5,390,605
[45] Date of Patent: Feb. 21, 1995

[54] STABILIZED AND PROPELLED DECOY, EMITTING IN THE INFRA-RED

[75] Inventors: Gérard Meili, Bordeaux; Jean-Luc Pinchot, Saint Medard en Jalles, both of France

[73] Assignee: Societe Nationale des Poudres et Explosifs, Paris, France

[21] Appl. No.: 104,581

[22] Filed: Aug. 11, 1993

[30] Foreign Application Priority Data

Aug. 11, 1992 [FR] France ................. 92 09897

[51] Int. Cl.⁶ ........................................... F42B 4/26
[52] U.S. Cl. ........................... 102/336; 102/342; 102/351
[58] Field of Search ................ 102/336, 342, 351

[56] References Cited

U.S. PATENT DOCUMENTS

| | | | |
|---|---|---|---|
| 2,944,486 | 7/1960 | Jasse | 102/49 |
| 3,008,414 | 11/1961 | Jasse | 102/49.3 |
| 3,150,848 | 9/1964 | Lager | 214/14 |
| 3,358,603 | 12/1967 | Hohenner | 102/49.3 |
| 4,015,427 | 4/1977 | Brooks | 60/253 |
| 4,222,306 | 9/1980 | Maury | 89/16 |
| 4,624,186 | 11/1986 | Widera et al. | 102/336 |
| 5,136,950 | 8/1992 | Halpin et al. | 102/336 |

FOREIGN PATENT DOCUMENTS

| | | |
|---|---|---|
| 0309033 | 3/1989 | European Pat. Off. . |
| 2063653 | 7/1972 | Germany . |

*Primary Examiner*—Peter A. Nelson
*Attorney, Agent, or Firm*—Cushman, Darby & Cushman

[57] ABSTRACT

The present invention lies in the field of infra-red decoys for protecting aircraft.

It relates more particularly to a stabilized decoy (4, 21) propelled over a trajectory and with directed infra-red emission, comprising a body (22) open over its rear part (24) containing an emissive block (28, 40) made of pyrotechnic substance and an ignition assembly for the said block, characterized in that the said body includes an ogive (23) at its front part and has an aperture of constant cross-section at its rear part (24), in that the ignition assembly comprises an ejectable pyromechanical device (6, 26) situated at the rear of the said body and an ignition charge (29) situated at the front of the said body and in that the said emissive block (28, 40) has at least one channel and is placed between the ignition charge (29) and the ejectable pyromechanical device (6, 26).

FIG. 2 to be published

12 Claims, 2 Drawing Sheets

STABILIZED AND PROPELLED DECOY, EMITTING IN THE INFRA-RED

FIELD OF THE INVENTION

The present invention lies in the field of passive countermeasures. Its object is to protect platforms, such as aircraft, when they are attacked by a homing missile.

This protection is given by attracting the missile away from the platform with the aid of a decoy which fools the homing head of the missile by substituting itself for the platform. The homing head of the missile operates either in the infra-red; the decoy must produce an infra-red signature equivalent to that of the platform, or in the region of electromagnetic waves; the decoy must then exhibit a radar equivalent cross-section comparable to that of the platform.

The decoy is more particularly an object, ejected from a decoy launcher fixed to the platform to be protected. The decoy follows a trajectory over which it is possibly stabilised and propelled. The decoy produces radiation in a preferred direction and this radiation is preferably in the infra-red.

BACKGROUND OF THE INVENTION

For producing these decoys, it is known to use emissive blocks contained in an enclosure closed by a nozzle or an orifice forming a nozzle as described in the Patent FR 2,294,422. These blocks are manufactured with a pyrotechnic substance, the combustion of which produces the infra-red radiation.

The decoy is in a launch tube the mouth of which is turned rearwards on the aircraft. The decoy is arranged there in such a way that its rear is on the same side as the mouth of the launch tube. The decoy will be ejected directly into the wind, its direction of movement when it is propelled is close to that of the platform to be protected, at least during the first instance of operation. The front and rear parts of the decoy are identified with respect to its direction of movement over its trajectory in the propelled phase.

After exit from the launch tube, the decoy is stabilised over its trajectory: that is to say that it has no tendency thereon to be affected by a disordered and/or turbulent movement. The Patent EP 0,309,097 describes the stabilisation of the decoy by a telescopic balance weight at the front of the decoy.

The emissive block of the decoy is then fired. The combustion products (gases and particles) accelerated by the nozzle provide the propulsion of the decoy on the one hand and the directive radiation on the other hand. Finally, the nozzle, while providing the directive effect, also diminishes the sensitivity of the flame to the external wind.

A first problem is that the nozzle of this decoy exhibits drawbacks, which are:
presence of an additional mechanical part, which is more or less complicated and thus costly,
presence of an inert mass which makes the decoy heavier,
device whose thrust is not optimal at all altitudes.

A second problem is to ensure the correct ignition of the emissive block.

In fact, according to current practice, (see, for example, Patent FR 2,294,422) the decoy is ignited by the use of the ejection assembly. This assembly is actuated by an ejection charge and it serves as a piston for ejecting the decoy. This ejection assembly includes at least one pyrotechnic delay initiated by the ejection charge. This pyrotechnic delay will ignite the ignition charge arranged in the decoy, the latter charge ensuring the firing of the emissive block.

When the decoy is engaged in the launch tube, its front part turned towards the bottom of the said tube, the previously described arrangement for ensuring the ejection of the decoy and the ignition of the emissive block cannot be used without adding a device which caters for the closing and the sealing of the passage for the ignition gases at the front of the decoy when the latter has to operate.

The separation of the two functions, one of ejection of the decoy, the other of ignition of the emissive block, will pose two other problems, i.e. the increase in the weight of the decoy when a whole ignition assembly, independent of the ejection device, is placed at the front of the decoy as it will not be separable from the decoy, or a less satisfactory ignition of the emissive block when the whole ignition assembly is installed at the rear of the decoy in order to be separated therefrom after ignition of the emissive block.

SUMMARY OF THE INVENTION

The present invention relates to a stabilised decoy, self-propelled over a trajectory and with directed infra-red emission, comprising a body open over its rear part containing an emissive block made of a pyrotechnic substance and an ignition assembly for the said block, characterised in that:

the said body includes an ogive at its front part and an aperture of constant cross-section at its rear part, the ignition assembly comprises an ejectable pyromechanical device situated at the rear of the said body and an ignition charge situated at the front of the said body, the said emissive block has at least one channel and is placed between the ignition charge and the ejectable pyromechanical device.

The ogive may be produced very simply by a conical shape whose vertex is blunted.

Preferably, the ejectable pyromechanical device includes a flame distributor which directs the flame from the initiator incorporated in the ejectable pyromechanical device towards the ignition charge placed at the front of the decoy.

Preferably, the emissive block of the decoy has an initial slenderness ratio which is greater than or equal to 3; the slenderness ratio is the ratio l/d where l represents the initial length of the block and d its initial diameter.

Advantageously, the emissive block has at least one channel whose initial passage area is less than that of the aperture of the rear part of the body of the decoy. Advantageously, the emissive block has a single channel, whose axis is coincident with that of the decoy.

The combustion of the pyrotechnic substance produces gases and possibly particles. The flow rate of these products in the channel increases from upstream downwards, this increasing flow rate, transiting in a channel of constant or very slowly varying cross-section, will take place at an increasing speed from upstream downwards. When the emissive block exhibits the previously quoted characteristics (slenderness ratio greater than or equal to 3, conditions in the passage areas) at the output of the channel the jet of the combustion products is sufficiently rapid that the reaction force which it exerts on the decoy suitably propels the latter. In the present case, the acceleration of the combustion gases and the propulsion take place without recourse to a nozzle.

Advantageously, the emissive block exhibits a shape making it possible to obtain two thrust plateaux. The emissive block has a channel whose combustion surface area is large at the start of combustion. This large initial combustion surface area corresponds to a high flow rate of combustion products, thus a powerful thrust for accelerating the decoy over its trajectory. Next, during the second phase of the combustion, a smaller combustion surface area corresponding to a less powerful thrust which is sufficient to maintain the speed of the decoy during this cruise phase.

These two combustion, and hence thrust regimes give the decoy a trajectory which is matched to that of the platform to be protected: the decoy does not remain in the wake behind the platform or does not move away from it too rapidly.

The emissive block of the decoy is manufactured from a mixture comprising a plastic binder, at least one reducing metal and at least one oxidant. The reducing metal is chosen from among aluminium, magnesium, zirconium. The oxidant is chosen from among the perchlorates, the nitrates.

The composition may also include various additives for improving the feasibility, the mechanical properties, the kinetic properties and the radiation performance aspects.

The plastic binder may be of the thermosetting type; this is to say it may be constituted by a copolymer which, instead of melting under the action of the heat, will harden. As an example, the phenolic moulding compounds, the polyesters, the polyurethanes, the epoxides may be quoted. The preferred binder is a polyurethane obtained by the action of one or more polyisocyanates on a hydroxytelechelic polybutadiene. The method of implementation is that of the mixing of the ingredients so as to form a homogenous paste. The shaping of the blocks is done by casting or injecting into a mould for hardening the composition. It is also possible to envisage a two-component process with injection and mixing of the reactive constituents in the shaping mould.

The plastic binder may also be of the thermoplastic type, that is to say may be constituted by an aggregate of long molecules which softens by heating and can thus be moulded. The method of implementation consists in encasing the ingredients (reducers and oxidants) in the thermoplastic binder. The shaping of the blocks is done on a press or by extrusion.

The advantages of the invention thus clearly appear:

by the elimination of the nozzle the decoy is simplified and lightened and its operation is also adapted to all altitudes, by the shape of the block (slenderness ratio and cross-section) the thrust is obtained without a nozzle, by the separation of the ignition system into two parts: on one hand, the pyromechanical device at the rear, ejectable after operation and, on the other hand, the ignition charge at the front, ignition of the emissive block is carried out under good conditions while preserving the benefit of the lightening (ejectable element), the rear part which extends the body provides, with respect to the external wind, protection of the radiating flame and maintains the effectiveness of its radiation.

BRIEF DESCRIPTION OF THE DRAWINGS

The invention is set out below in greater detail with the aid of figures representing a particular embodiment.

DETAILED DESCRIPTION OF THE INVENTION

A decoy launcher is a device fixed onto the platform to be protected, in the present case an aircraft, and is linked electrically to the pilot's position from whence the firing command comes.

The decoy launcher especially comprises tubes which serve for launching the decoy; in the present case we are interested in only one of these tubes. This tube is turned rearwards on the aircraft with a certain inclination with respect to the median vertical plane of the aircraft and to its horizontal plane.

Figure 1:
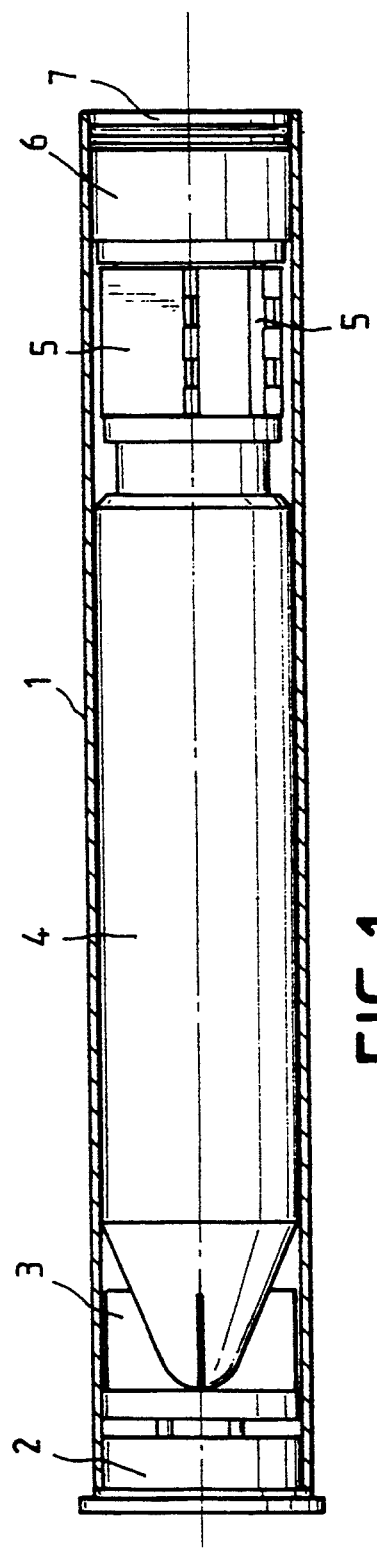
FIG. 1 represents, diagrammatically and in partial cross-section, the decoy which is the subject of the invention in its launch tube.

FIG. 1 represents a launch tube I in section, a decoy 4, the stabilising winglets 5 are folded, the pyromechanical device 6 is engaged in the rear part of the decoy. The ejection charge arranged in a block 2 pushes back the ejection piston 3 which presses on the ogive of the decoy. A leaktight cap 7 closes off the mouth of the tube: it is destroyed upon ejection of the decoy.

Figure 2:
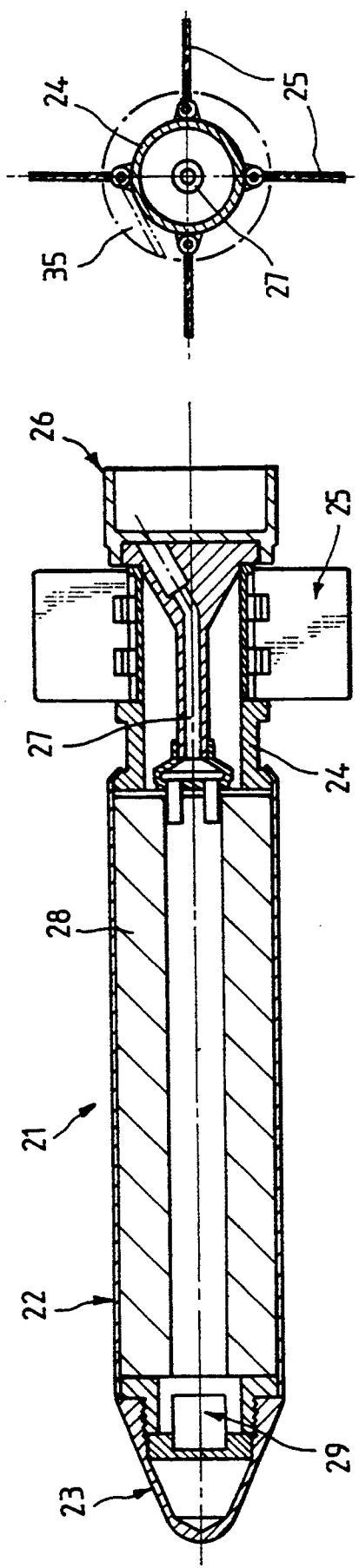
FIG. 2 is a diagram of the decoy out of its tube, winglets deployed, the pyromechanical device is still in place.

FIG. 2 represents the decoy after its ejection from the launch tube: the stabilising winglets are deployed and locked, the pyromechanical device is still in place in the rear part. The decoy 21 includes a body 22 on which are fixed, at the front, an ogive 23 and, at the other extremity, the rear part 24 which carries the stabilising winglets 25. The pyromechanical device 26, extended by a flame distributor 27, is engaged and bonded into the rear part 24. Within the body 22 is the emissive block 28, made of a pyrotechnic substance. Towards the front of the decoy and within the ogive, in the same chamber as the block, is the ignition charge 29.

The pyromechanical device 26 is ejectable. It includes a percussion cap which initiates a pyrotechnic delay which will discharge via the flame distributor 27. It also includes operating safety devices, otherwise known and which will not be described in more detail here; these devices de-align the pyrotechnic chain in the event of an operating anomaly.

The flame distributor 27, which here terminates in two funnels, directs the flame from the pyrotechnic delay towards the ignition charge 29 through the channel (or the channels) of the emissive block 28, and initiates the ignition charge in its turn.

The ignition charge 29 then ensures ignition of the emissive block 28. The combustion products cause the pressure to rise until it is sufficient to detach and eject the pyromechnical device 26. The jet of combustion products which is then established will produce the propulsive and radiating effect.

Figure 3:
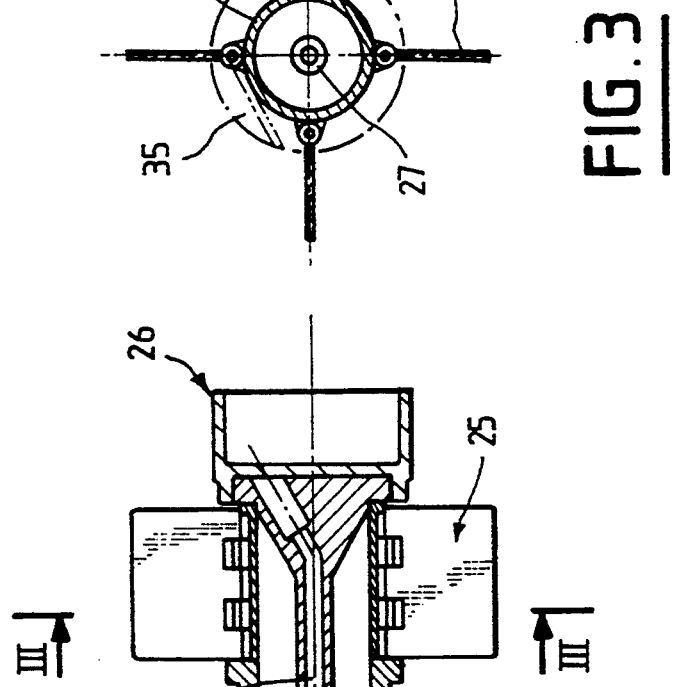
FIG. 3 represents the rear part of the decoy in cross-section.

FIG. 3 represents, in section, the rear part 24 of the decoy: the flame distributor 27 and the winglets 25 in deployed position will be found there. This rear part is essentially circular. Its internal diameter is such that the corresponding passage area is greater than the passage area of the initial channel of the emissive block. The external diameter of this rear part 24 is smaller than the calibre of the decoy (and hence than the internal diameter of the launch tube) in such a way that when the decoy is engaged in the launch tube (reference 1 of FIG. 1) the winglets are folded (reference 35) onto the rear part in the annular volume lying between this rear part and the launch tube. The circle in dots and dashes corresponds to the circle with diameter equal to that of the launch tube.

Figure 4:
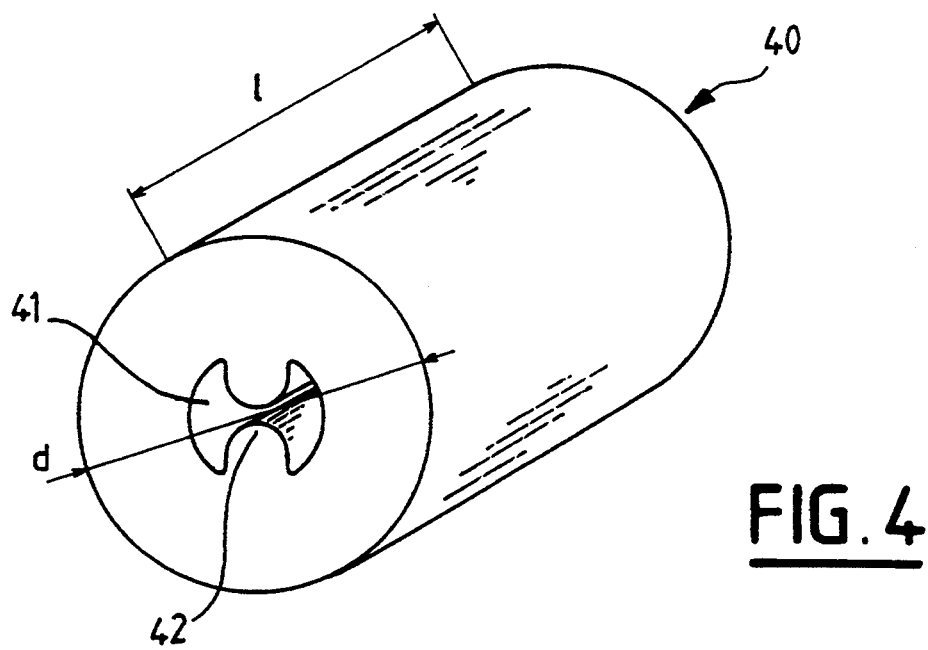
FIG. 4 represents an emissive block made in a pyrotechnic substance.

FIG. 4 represents the emissive block 40 made of pyrotechnic substance. This block is cylindrical and includes a central channel 41 with substantially constant cross-section with two longitudinal ribs 42. These two longitudinal ribs 42 practically divide the channel 41 into two parts which explains the two funnels at the extremity of the flame distributor, engaged in the channel in order to direct the flame through each of the parts of the channel limited by the longitudinal ribs 42. This block has an external diameter of 47 mm for a length of 180 mm: the ratio l/d is greater than 3.8. The external lateral surface of the emissive block is coated with an inhibiting substance (not represented on this diagram) to prevent combustion of the substance on this surface.

Figure 5:
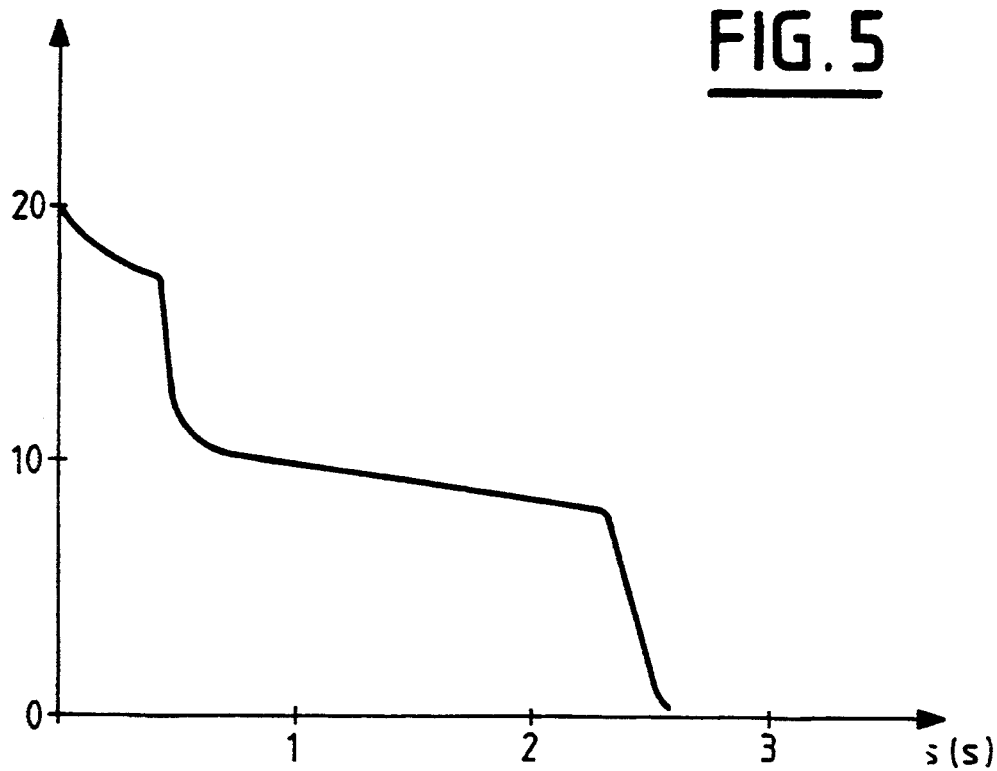
FIG. 5 represents the calculated development of the thrust as a function of time.

FIG. 5 represents the thrust as a function of time, shown here as a calculated prediction. This curve represents a first plateau of powerful thrust which provides the acceleration phase of the decoy over its trajectory, it corresponds to the phase of combustion of the longitudinal ribs; the combustion surface is significant. The second, weaker, thrust plateau corresponds to the cruise phase in which the decoy covers its trajectory at uniform speed, after the combustion of the two longitudinal ribs; the combustion surface is smaller.

We claim:

1. A self-propelled, stabilized decoy having a directed infra-red emission, said decoy comprising a body having a nose at the front end and an opening at the rear part thereof, said rear part being cylindrical, said body containing an emissive block of pyrotechnical substance and an ignition assembly, said body comprising an ejectable pyromechanical device located near the rear part of said body, said body including a circular aperture of constant cross-section at said rear part and said emissive block having at least one channel located between said ignition assembly and said ejectable pyromechanical device.

2. Decoy according to claim 1, characterised in that the ejectable pyromechanical device (6, 26) includes a flame distributor (27).

3. Decoy according to one of claims 1 or 2, characterised in that the emissive block (28, 40) has a slenderness ratio l/d greater than or equal to 3.

4. Decoy according to claim 3, characterised in that the emissive block (28, 40) has at least one channel (40) whose initial passage area is less than that of the rear part (24) of the decoy.

5. A self-propelled, stabilized decoy having a directed infra-red emission, said decoy comprising a body having a nose at the front end and an opening at the rear part thereof, said body containing an emissive block of pyrotechnical substance and an ignition assembly, said body comprising an ejectable pyromechanical device located near the rear part of said body, said body including an aperture of constant cross-section at said rear part and said emissive block having at least one channel located between said ignition assembly and said ejectable pyromechanical device, said emissive block including a central channel with substantially constant cross-section and diametrically restricted by two longitudinal ribs.

6. Decoy according to claim 4, characterised in that the emissive block (28, 40) includes a central channel (41) with substantially constant cross-section, diametrally restricted by two longitudinal ribs (42).

7. Decoy according to claim 6, characterised in that the flame distributor (27) includes two funnels engaged in the central channel (41) of the emissive block (28, 40) on either side of the longitudinal ribs (42).

8. Decoy according to 1, characterised in that the rear part exhibits, an external diameter smaller than the calibre of the decoy and, an internal diameter such that the initial passage area of the channel of the emissive block (28, 40) is smaller than the passage area of said rear part (24).

9. Decoy according to 6, characterised in that the emissive block (28, 40) is a mixture comprising a plastic binder, at least one reducing metal and at least one oxidant.

10. A decoy as claimed in claim 5 wherein the flame distributor includes two funnels engaged in the central channel of said emissive block on either side of the longitudinal ribs.

11. The decoy according to claim 5 wherein the rear part is cylindrical and exhibits an external diameter smaller than the calibre of the decoy and an internal diameter such that the initial passage area of the channel of the emissive block is smaller than the passage area of said rear part.

12. The decoy as claimed in claim 5 wherein said emissive block is a mixture comprising a plastic binder, at least one reducing metal and at least one oxidant.

* * * * *